April 30, 1935. T. A. FJELLSTEDT 1,999,288
HYDRAULIC TRANSMISSION FOR MOTOR VEHICLES
Filed April 13, 1932   2 Sheets-Sheet 1
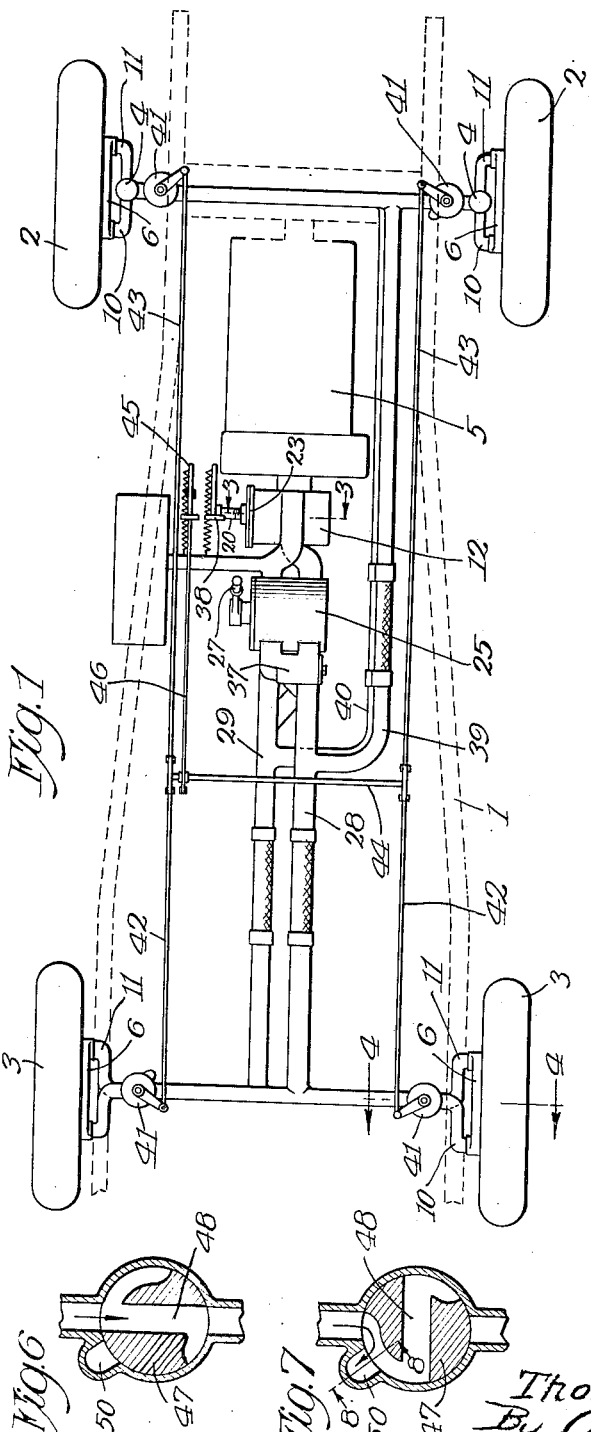
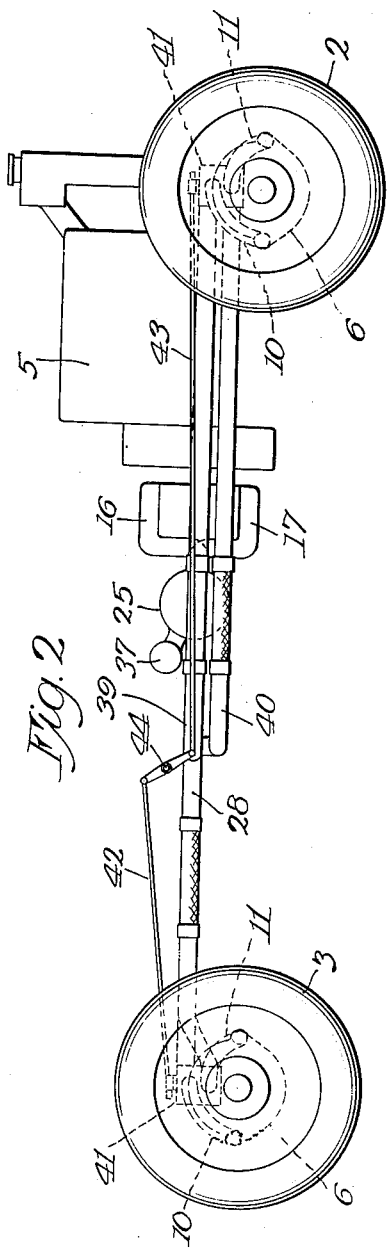
Inventor:
Thorsten A. Fjellstedt
By Arthur F. Durand Atty.

April 30, 1935.  T. A. FJELLSTEDT  1,999,288
HYDRAULIC TRANSMISSION FOR MOTOR VEHICLES
Filed April 13, 1932  2 Sheets-Sheet 2
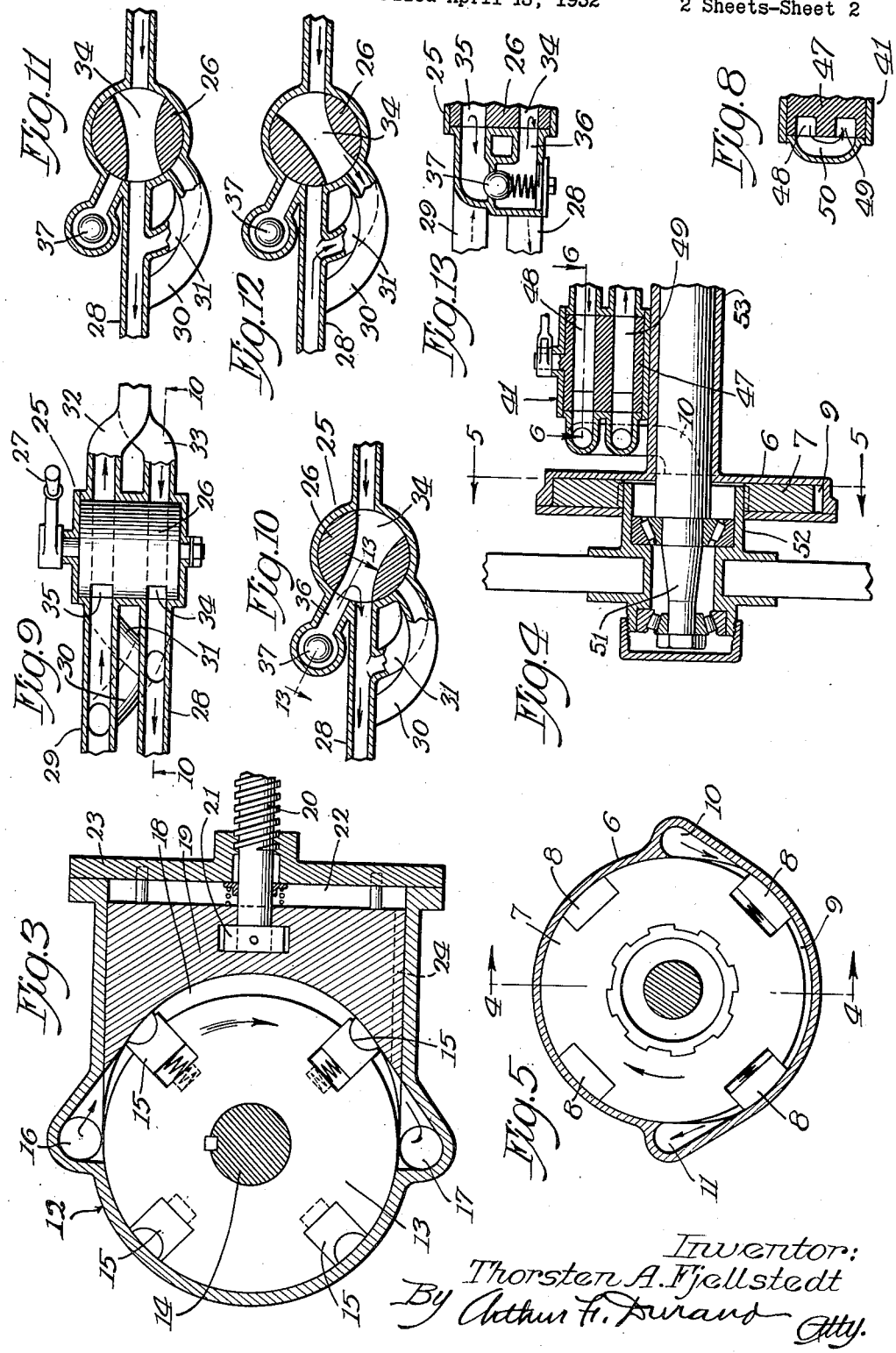
Inventor:
Thorsten A. Fjellstedt
By Arthur F. Durand
Atty.

Patented Apr. 30, 1935

1,999,288

UNITED STATES PATENT OFFICE 1,999,288

HYDRAULIC TRANSMISSION FOR MOTOR VEHICLES

Thorsten A. Fjellstedt, Wheaton, Ill.

Application April 13, 1932, Serial No. 604,995

6 Claims. (Cl. 60—53)

This invention relates to hydraulic drive or transmission between the engine and the traction wheels of a motor vehicle.

Generally stated, the object of the invention is to provide a novel and improved construction whereby a motor vehicle may be driven by a fluid pressure transmission of such character that each vehicle wheel is individually driven, and is in effect a self operating motor wheel, whereby it is possible to eliminate the ordinary mechanical differential gearing generally employed in motor vehicles, and also to eliminate the ordinary mechanical gear shift of vehicles of this general class, while at the same time providing for a free wheeling action or effect of the vehicle wheels on fixed axles, as well as a reversal of the fluid or hydraulic transmission drive, and a fluid braking effect on each of the motor operated wheels, whereby notwithstanding the elimination of said differential and said gear shift, the motor vehicle is nevertheless susceptible of the control which characterizes an ordinary motor vehicle.

It is also an object to provide certain details and features of construction and combinations tending to increase the general efficiency and the desirability of a motor vehicle having a hydraulic transmission between the internal combustion engine and the traction wheels thereof, of this particular character.

To the foregoing and other useful ends, the invention consists in the matters hereinafter set forth and claimed, and shown in the accompanying drawings, in which,—

Fig. 1 is a plan view of a motor vehicle embodying the principles of the invention.

Fig. 2 is a side elevation thereof.

Fig. 3 is an enlarged detail section on line 3—3 in Fig. 1 of the drawings.

Fig. 4 is an enlarged vertical section on line 4—4 in Fig. 1 of the drawings.

Fig. 5 is a vertical transverse section on line 5—5 in Fig. 4 of the drawings.

Fig. 6 is a horizontal section on line 6—6 in Fig. 4 of the drawings, showing the valve in one position thereof.

Fig. 7 is a similar view, showing the valve in a different position.

Fig. 8 is a detail section on line 8—8 in Fig. 7 of the drawings.

Fig. 9 is an enlarged plan view of a portion of the apparatus, showing certain portions thereof in horizontal section.

Fig. 10 is a vertical longitudinal section on line 10—10 in Fig. 9 of the drawings.

Fig. 11 is a view similar to Fig. 10, showing the valve in a different position.

Fig. 12 is a similar view, showing the valve in a different position.

Fig. 13 is a detail sectional view on line 13—13 in Fig. 10 of the drawings.

As thus illustrated, the invention comprises a motor vehicle having a suitable body frame or chassis 1, with front and rear wheels 2 and 3 of any suitable form or character. The front wheels may have steering knuckles 4 of suitable character, to permit the usual control of these wheels to steer the vehicle.

The internal combustion engine 5 may be of any suitable known or approved character, and is mounted on the frame or chassis in any suitable or desired manner.

Each wheel has a rotary motor of the character shown in Figs. 4 and 5 of the drawings. Each motor, it will be seen, comprises a stationary casing 6 in which a rotor 7 is mounted to rotate, said rotor having vanes or piston-like radial shoes 8 that rub on the inner circumference of the casing or cylinder in which the rotor is enclosed. At one side of the casing, there is a space 9 between the periphery of the rotor and the inner surface of the casing, and the casing has a fluid-pressure inlet 10 and a fluid-pressure outlet 11, as shown. The fluid pressure entering at 10 impinges on the vanes or shoes 8, while the latter are in the space 9, and propel the rotor about its axis, thereby to drive the vehicle wheel.

To furnish the fluid pressure to drive the four rotary motors, thus allotted to the four vehicle wheels, a rotary pump 12 is provided, constructed as shown in Fig. 3 of the drawings. This pump comprises a rotor 13 mounted on the engine shaft 14 and provided with radial vanes or piston-like shoes 15, as shown. These vanes, like those of the motors, are preferably spring-backed, to keep them in effective engagement with the inner circumference of the casing. The pump has a fluid inlet 16 and a fluid outlet 17, whereby the fluid enters the space 18 from the inlet 16, and leaves this space through the outlet 17, the rotor and its blades rotating in the direction indicated by the arrow. To provide this space 18, an adjustable cylinder wall 19 is provided, movable toward and away from the axis of the rotor, whereby to enlarge or reduce the space 18 at will. A screw 20, swiveled at 21 in the cylinder wall, is provided for adjusting the cylinder wall toward and away from the rotor. A space 22 is provided between the outer side of the cylinder wall and the fixed casing plate or head 23, as shown. The space 22 communicates by a passage 24 with the space 18, permitting the adjustable cylinder wall to be moved one way or the other with ease and convenience. With this arrangement, while the engine shaft 14 is rotating at a constant speed, the speed of output from the pump may be varied at will, by the adjustment of the wall 19 toward or away from the rotor. If it is desired to speed up the output from the pump, the wall 19 is moved away from the rotor, so that in effect the radial vanes or shoes 15 are lengthened, and the space 18 is increased, whereby the speed of output from the pump is greater, but with less pressure, inasmuch as the effective pressure faces of the vanes 15 are by such adjustment a little farther away from the shaft 14, and with the torque on the latter remaining the same, the pressure of the faster output from the pump will be less. On the other hand, if it be desired to slow up the output from the pump, to increase the effective pressure of the output, the wall 19 will be moved toward the rotor, thus in effect shortening the vanes or shoes of the rotor, and reducing the area of the space 18, whereby the fluid will leave the pump at less speed, but with greater pressure. In this way, the adjustable rotary pump, having a variable output, simulates the change speed gearing or transmission of an ordinary motor vehicle, and the fluid pumped to the rotary motors on the wheels can be controlled to vary the speed of the vehicle, from low to high, so to speak, with substantially the same effect that is obtained by the gear shift of an ordinary motor vehicle.

Preferably, there is also a reversing valve arrangement 25, between the pump and the rotary motors, which is also capable of use for free wheeling, so to speak, during the forward drive, which valve device is constructed as shown in Figs. 9, 10, 11, 12 and 13 of the drawings. This valve mechanism has a rotary cylindrical valve member 26 adapted to be operated by a handle or lever 27, arranged conveniently within reach of the driver of the vehicle. It will be seen that the pipes 28 and 29 lead to the motors of the rear wheels, and that the casing of the valve has the short pipes 30 and 31 leading therefrom to the pipes 29 and 28, respectively. The pipes 32 and 33 lead, respectively, to the inlet 16 and outlet 17 of the pump. With the valve member 26 formed as shown in Figs. 10, 11 and 12, having the passages 34 and 35 therein, the valve member 26 can be turned to the positions shown in Figs. 10, 11 and 12 of the drawings, in which case the drive in Fig. 10 will be forward with what might be called free wheeling by reason of the by-pass 36 having the check valve 37 therein, while in Fig. 11 the drive is straight ahead, with either high or low power, depending upon the adjustment of the pump, and in Fig. 12 the drive is in reverse, so to speak, with either high or low power, there being a pedal 38 for controlling the screw 20 for the adjustment of the pump. It will be seen that pipes 39 and 40 are tapped off from the pipes 28 and 29, respectively, and lead forward to the rotary motors of the front wheels.

Thus, the vehicle can be driven either forward or back, by the hydraulic transmission, through the medium of a variable output pump, whereby the speed and power, so to speak, of the engine may be changed or varied at will, with substantially the same effect that is obtained with the gear shift of an ordinary motor vehicle.

As a matter of further and special improvement, the rotary motor of each wheel is provided with a brake valve device 41 controlled by the rods 42 and 43 leading to the transverse rock shaft 44, which latter is rocked by the pedal 45 through the medium of a rod 46, whereby all four brake valves can be operated simultaneously, to in this way provide what is equivalent to a four-wheel braking effect. As the four brake valves are all alike, a description of one, as shown in Figs. 4 and 8, will be sufficient. As here shown, the rotary valve member 47 is mounted to rotate about a vertical axis, and has the passages 48 and 49, as shown. When these passages are in communication with the inlet and outlet openings 10 and 11 of the adjacent rotary motor, the latter will be driven at full power. However, when the valve member 47 is rotated to cut off this supply of fluid pressure to the rotary motor, the flow of the liquid will be diverted through the by-pass 50 at one side of the valve casing, thereby to prevent back pressure on the pump, and at the same time to slow up the rotation of the rotary motor, and thereby in effect slow up the rotation of the vehicle wheel. If the flow of liquid to the rotary motor is entirely cut off, the entire flow will be through the by-pass, and the rotation of the vehicle wheel will be stopped. Thus, a braking action is obtained on all four wheels at the same time, and a four-wheel braking effect is provided.

From the foregoing, it will be seen that the hydraulic drive, the liquid being oil or glycerine or any other non-freezing liquid, is controllable to propel the vehicle either fast or slow, with the effect of relatively low power for the high speed, and with the effect of relatively high power for the low speed, in a manner similar to what is obtained by the use of the transmission and the gear shift on an ordinary motor vehicle. This is accomplished by the adjustment of the pump in a manner whereby the speed of output thereof is changed or varied at will, with what is in effect less power for the high speed output, and greater power for the low speed output, which very closely simulates the drive or output from a mechanical change-speed gear transmission on an ordinary motor vehicle.

During the so-called free wheeling effect, it will be seen that the rotary motors become pumps, inasmuch as they circulate the fluid to and from the reversing valve mechanism, as shown by the arrows in Fig. 13, while at the same time the fluid from the pump is circulating through the motors, shown in Fig. 13 of the drawings. But, at any time, the brake valves allotted to the wheels can be controlled at will, to control the passage of fluid to and from the rotary motors on the wheels, thereby to produce the said braking action.

It will be understood, of course, that, instead of having a rotary motor on each and every wheel of the vehicle, a rotary motor can be used on only one wheel, or on two or more of the wheels. Again, it is obvious that a single rotary motor, driven by the rotary pump, can be employed, as by putting it on the rear drive shaft of an ordinary motor vehicle, to drive two or more of the vehicle wheels.

Thus, in every way, the hydraulic drive herein shown and described, which is illustrative of one form of the invention, very closely simulates the forward and back drive of an automobile, and the reverse thereof, as well as the braking action of an ordinary automobile. Of course, the valve 26 will be opened fully, for either the forward or backward drive. When the valve is fully open, and the drive is forward, it will be understood that this will simulate high speed on an ordinary automobile, and will be equivalent thereto, and that by using the ordinary accelerator (not shown) of an automobile, the vehicle can then be driven, either slowly or at high speed, exactly like an ordinary automobile, without resort to adjustment of the pump. The adjustment of the pump, in other words, is merely to take the place of the gear shift, on an ordinary automobile, and to provide more power, in effect, when the load on the engine is increased, as by a steep hill, mud, sand or snow, thereby requiring that the motor vehicle be put in low, so to speak, for the same reason that an ordinary motor vehicle has a gear shift by which it can be put in low under the same conditions. Thus, the adjustable pump is a substitute for the gear shift and change-speed gearing on an ordinary motor vehicle, and very closely approximates the operation thereof, so far as the general effects are concerned, as previously explained.

Thus it will be seen that each wheel 2 or 3 is mounted on a rigid or fixed axle 51. It will also be seen that the enclosed rotor 7 of each wheel motor is rigid with the hub 52 of its allotted wheel, whereby each wheel and its rotor are mounted to rotate on a fixed or rigid axle, except that for the front axles knuckle joints are provided, as previously explained, to permit steering in the usual manner. Allotted to each combined wheel and motor, there is a braking valve, preferably supported on the tubular housing 53 of the axle, which latter is held against rotation in any suitable or desired manner, the casing of the motor being rigid with the said tubular axle housing.

What I claim as my invention is:

1. In a hydraulic drive or transmission for motor vehicles, in combination with the motive power and the traction wheels thereof, a manually operable controlling valve for the transmission having passages and means co-operating therewith whereby the valve has three positions, (1) a position for the forward drive, (2) a position for the reverse, and (3) a position for forward drive with free wheeling, all in one and the same valve mechanism, hydraulic connection to each wheel, from said mechanism, and with individual brake valves in said connection, for the vehicle wheels, operative to brake the wheels in any position of said valve mechanism.

2. A structure as specified in claim 1, comprising a pump operated by the motive power, together with a rotary motor for each vehicle wheel, having fluid conduit connection with said pump, controlled by said brake valves, said valve mechanism being disposed between said pump and said brake valves.

3. A structure as specified in claim 1, comprising a pump in said transmission, said pump being adjustable to simulate the action of an ordinary gear transmission for changing the speed of the vehicle, for any position of said valve mechanism.

4. In a hydraulic transmission drive for motor vehicles, a manually operable main valve mechanism for controlling the direction of travel of the vehicle, said mechanism comprising a single manually operable rotary valve having a free wheeling position, a pump and liquid conduit connections therefrom to said valve mechanism, motor instrumentalities for driving the vehicle wheels, also having liquid conduit communication with said mechanism, and means for manually adjusting said mechanism in different positions, including the position necessary for free wheeling.

5. A structure as specified in claim 4, comprising manually operable brake valve instrumentalities, in the second mentioned conduits, said valve mechanism being disposed between said pump and said brake valve instrumentalities.

6. A structure as specified in claim 4, said valve mechanism having by-pass means to circulate liquid around the pump during the free wheeling travel of the vehicle.

THORSTEN A. FJELLSTEDT.